United States Patent
Wayne

[15] 3,667,616
[45] June 6, 1972

[54] STRAINER

[72] Inventor: Alex Wayne, Des Moines, Iowa
[73] Assignee: Delavan Manufacturing Company
[22] Filed: Oct. 29, 1970
[21] Appl. No.: 85,170

[52] U.S. Cl............................................210/451, 210/478
[51] Int. Cl.......................................................B01d 35/28
[58] Field of Search..................210/435, 437, 446, 448, 451, 210/478, 497, 499

[56] References Cited

UNITED STATES PATENTS

| 284,428 | 9/1883 | James | 210/497 X |
| 292,912 | 2/1884 | Heath | 210/497 X |
| 1,137,480 | 4/1915 | Gwynn | 210/497 X |
| 2,198,819 | 4/1940 | Holm | 210/448 X |
| 3,458,050 | 7/1969 | Cooper | 210/448 |

Primary Examiner—Samih N. Zaharna
Assistant Examiner—R. W. Burks
Attorney—Molinare, Allegretti, Newitt & Witcoff

[57] ABSTRACT

A fluid strainer and method of making same comprises an integral one-piece body having a mounting end, a strainer end and a cap member, both the strainer end and the cap member having a cross sectional dimension smaller than that of the strainer element. The strainer element is slid over the cap member and strainer end and is brought into abutting relationship with a shoulder which separates the mounting and strainer ends and the cross sectional dimension of the cap member is radially expanded in cross sectional dimension so as to engage the strainer element and firmly position and retain same on the strainer body.

6 Claims, 3 Drawing Figures

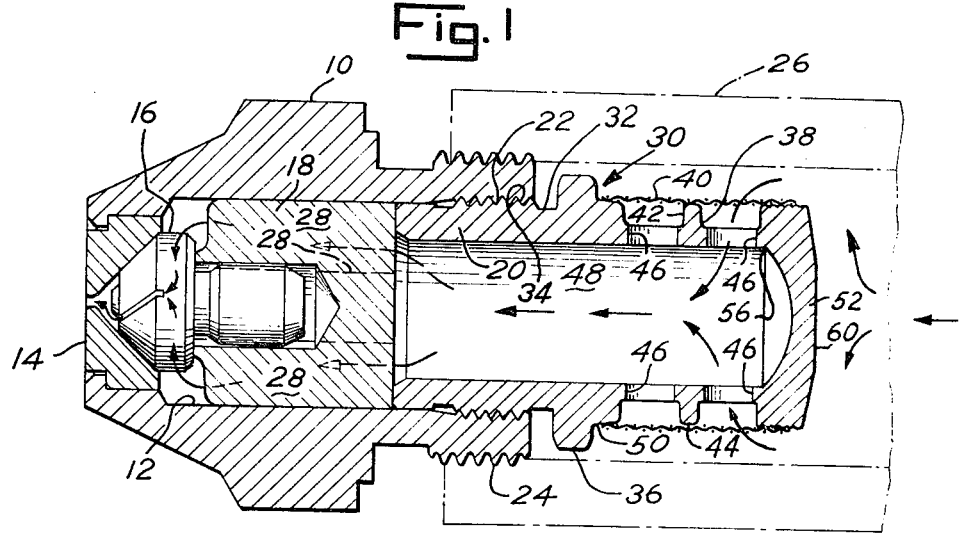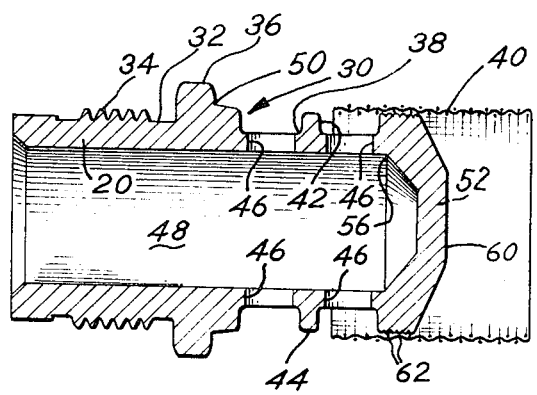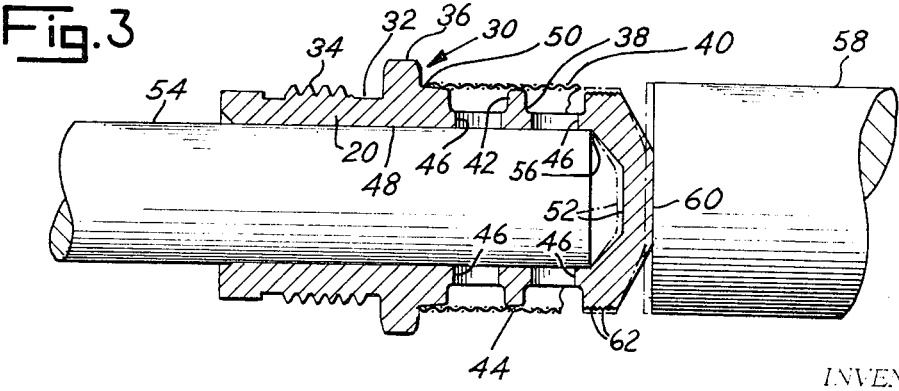
INVENTOR.
ALEX WAYNE
BY Molinare, Allegretti,
Newitt & Witoff
ATTORNEYS 3,667,616

STRAINER

BACKGROUND AND SUMMARY OF THE INVENTION

This invention relates to fluid strainers and, more particularly, to an improved fluid strainer and method of making same.

In the past fluid strainers have generally been assembled by first positioning the strainer on the strainer body and then screwing or otherwise attaching an enlarged separately formed cap member on the strainer body over the end of the strainer element to hold the element in place. This construction is not only somewhat expensive, since the strainer body and the cap member must be manufactured separately, but also, since the strainer body and cap member are separate pieces, the likelihood exists that the cap member will vibrate loose during use and either become separated from the strainer or allow fluid to by-pass the strainer without being strained.

In the present invention, the expense of such strainers is not only reduced, but also the possibility of separation or loosening of the cap member during use is avoided. In the present invention the cap member and strainer body are formed in integral one-piece relationship and the cap member is subsequently compressively expanded in order to firmly engage and retain the strainer element on the strainer body.

One aspect of the invention comprises a method of making a strainer of the type having a strainer element, a body having a first enlarged mounting end and a second strainer element carrying end which is separated from the first end by a shoulder which is adapted to receive the strainer element, and a longitudinal fluid passage extending through the first end and at least a part of the second end and communicating with the exterior of the second end. A cap member, having a cross sectional dimension which is smaller than the internal dimension of the strainer element, is formed on the end of the second body end opposite the shoulder in integral one-piece relationship with the body and in closing relationship to the passage. The strainer element is then slid over the cap member and the second end against the shoulder and the cross sectional dimension of the cap member is enlarged by deforming the cap member to a larger dimension, such that it engages the strainer element to firmly retain the strainer element on the second body end.

Another principal aspect of the invention comprises a strainer which includes a body having a first mounting portion, a second strainer element carrying portion and a compressively expanded cap portion formed in integral one-piece relationship with the second portion. A shoulder is defined between the first and second portions and a strainer element surrounds the second portion and is retained thereon by the expanded cap portion. A fluid passage extends through the body and is closed at one end by the expanded cap portion and the passage communicates through the second portion of the body with the strainer element.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a cross sectioned side elevation view through a preferred embodiment of strainer constructed in accordance with the principles of the invention and showing the strainer mounted for use in a spray nozzle body;

FIG. 2 is an elevation view of the strainer shown in FIG. 1 in which the strainer element is shown being installed on the strainer body; and FIG. 3 is an elevation view of the strainer showing the cap member being compressively expanded to complete the assembly of the strainer.

DESCRIPTION OF THE PREFERRED EMBODIMENT

A preferred embodiment of nozzle which is constructed in accordance with the principles of the invention is shown in the drawings. The strainer may be, for example, of the type which is to be mounted directly in a spray nozzle body for insuring that particulate contaminates and other foreign matter which may be present in the fluid stream which is to be sprayed are removed prior to the fluid stream arriving at the spray orifice and other close tolerance passages in the nozzle device. Such typical spray nozzles may include a nozzle body 10 having an elongate passage 12 therein which is open at both ends for receiving an orifice disc 14, a fluid distributor 16, a distributor retainer 18, for maintaining the distributor and orifice plate firmly positioned in the body when the strainer mounting nipple 20 is threaded against the distributor retainer by way of internal threads 22 in the body and as shown in FIG. 1. The body 10 is also externally threaded at 24 such that it may be mounted at the end of a suitable fluid delivery conduit 26. The retainer 18 is preferably cruciform in cross section so as to define a plurality of radially extending arms 28, the fluid flow through the assembly being shown by the arrows in FIG. 1. The spray nozzle construction will not be further described in detail since it does not form an essential part of the invention and is only illustrated to show how the preferred embodiment of strainer of the invention may be employed in practice.

The preferred embodiment of strainer of the invention includes a strainer body, generally 30, which may be cast, machined or otherwise suitably formed. The body 30 includes a first end or portion 32 having threads 34 defined thereon for cooperating with the internal threads 22 to adapt the strainer to be mounted to a suitable structure, such as the nozzle body 10 shown in FIG. 1. The end portion 32 of the strainer body 30 may also include a suitable tool receiving surface 36, such as an hexagonal or octagonal raised part, which is adapted to receive a wrench or the like for mounting of the strainer.

The strainer body 30 also includes a second strainer element carrying portion or end 38 having a minimum cross sectional dimension which is smaller than the internal cross sectional dimension of a strainer element 40 which is concentrically received thereon. One or more ribbed lands 42 may be provided on the external surface of body portion 38. The crests 44 of the lands preferably are positioned adjacent or just touch the interior of element 40 such that the strainer element is supported against collapse by the lands in a well-known manner during the straining operation. A plurality of apertures 46 are formed in the second body portion 38 to each side of the lands 42 and these apertures communicate the strainer element 40 with a longitudinally extending internal passage 48 in the strainer body so that filtered fluid which has passed through the strainer element will flow through the strainer body 30 to the nozzle body 10 as shown by the arrows in FIG. 1.

The strainer element 40 may be formed of any one of several screen materials of suitable mesh size and composition depending upon the fluids which are to be filtered and the degree of filtration which is desired. This screen material is formed into a sleeve which is preferably rigid and which is shaped geometrically substantially identical to the surface defined by the crests 44 of the land ribs 42 and is received over the second portion so as to butt against a shoulder 50 which separates the first and second body portions 32 and 38 from each other as shown in FIGS. 1 and 3.

Thus far, the strainer assembly which has been described is substantially of the conventional type. In this conventional type of strainer, the strainer element 40 is usually retained in position on the second body end 38 by way of a separate cap member which is screwed or otherwise fixed to the right end of the body, as viewed in the drawings. As a result, the cost of such strainer device employing a separate cap member is increased and the possibility exists that the cap member and strainer might become loose or separate from the remainder of the strainer body during use. The latter disadvantage becomes particularly critical where the strainer device is to be installed directly into a nozzle body as shown in FIG. 1, since such nozzle bodies frequently are subjected to substantial vibration in use. The strainer constructed in accordance with the principles of the present invention not only effects a reduction in the cost of manufacture over these prior strainer devices, but also insures against loosening or separation of the cap member and strainer element during use.

In the present invention, the cap member 52 is formed, by way of casting, milling or the like, in integral one-piece relationship at the end of the strainer body portion 38. This cap member 52 is initially formed such that it has a cross sectional dimension smaller than the internal dimension of the strainer element 40.

In order to assemble the strainer of the invention, the strainer element 40 is first slid over the smaller dimensioned cap member 52 and onto the body portion 38 as shown in FIG. 2, until it abuts against the shoulder 50. As shown in FIG. 3, a mandrel 54, having substantially the same diameter as passage 48 is then inserted into the passage into contact against the internal side 56 of the cap member and a push rod 58 is positioned to exert a force against the exterior surface 60 of the cap member to radially expand and deform the cap member so as to enlarge its cross sectional dimension to a dimension where it will engage the strainer element 40 and retain the element between the cap member 52 and the shoulder 50. The cap member 52 is preferably grooved at 62 about its perimeter to insure that it will firmly engage the end internal surface of the strainer element 40 during compression and will retain same on the strainer body.

Although in the embodiment shown and described, the cap member 52 is radially expanded such that it contacts the internal surface of the strainer element 40, it will be appreciated that the length of the strainer element may be such that the strainer element terminates just short of the cap member prior to expansion of the latter. In this construction, the cap member 52 will be expanded to a radial dimension somewhat larger than that of the strainer element 40 such that the cap member extends over and engages the end of the element to retain the element on body portion 38, rather than engaging the internal surface.

It will be understood that the embodiment of the present invention which has been described is merely illustrative of an application of the principles of the invention. Numerous modifications may be made by those skilled in the art without departing from the true spirit and scope of the invention.

What is claimed is:

1. In a method of making a strainer for straining matter from a fluid stream and which includes, a strainer element, a body having a first enlarged mounting end and a second smaller strainer element carrying end which is separated from said first body end by a shoulder which is adapted to receive said strainer element, and a longitudinal fluid passage extending through said first body end and at least a part of said second body end and communicating with the exterior surface of said second body end, said method comprising the steps of:

forming a cap member on the end of said second body end opposite said shoulder, said cap member being formed in integral one-piece relationship with said body in closing relationship to said passage, and having a cross sectional dimension smaller than the internal dimension of said strainer element, sliding said strainer element over said smaller cap member and said second body end into abutting relationship with said shoulder, and enlarging the cross sectional dimension of said cap member by compressively deforming said cap member to a larger dimension such that it engages said strainer element to firmly retain said element on said second body end.

2. In the method of claim 1 wherein said step of enlarging said cap member includes compressing said cap member between first pressing means which bears against the exterior surface of said cap member and second pressing means which is inserted into said passage.

3. In the method of claim 1 wherein said cap member engages the internal surface of said strainer element when said cap member is compressively deformed.

4. A strainer for straining matter from a fluid stream comprising:

a body having a first mounting portion, a second strainer element carrying portion and a compressively expanded cap portion formed in integral one-piece relationship with said second portion, a shoulder defined between said first and second portions, a strainer element surrounding said second portion and retained on said shoulder by said expanded cap portion, and a fluid passage extending through said body and closed at one end by said expanded cap portion, said passage communicating through said second portion of said body with said strainer element.

5. The strainer of claim 4 wherein said first and second body portions are also formed in integral one-piece relationship.

6. The strainer of claim 4 wherein the perimeter of said compressively expanded cap portion engages the internal surface of said strainer element.

* * * * *